US011804771B2

(12) United States Patent
Zhang et al.

(10) Patent No.: US 11,804,771 B2
(45) Date of Patent: Oct. 31, 2023

(54) CUSTOMIZABLE POWER CONVERTER AND CUSTOMIZABLE POWER CONVERSION SYSTEM

(71) Applicant: General Electric Company, Schenectady, NY (US)

(72) Inventors: Zheyu Zhang, Clifton Park, NY (US); Ramanujam Ramabhadran, Niskayuna, NY (US); Douglas Carl Hofer, Clifton Park, NY (US); Ahmed Elasser, Latham, NY (US)

(73) Assignee: General Electric Company, Schenectady, NY (US)

( * ) Notice: Subject to any disclaimer, the term of this patent is extended or adjusted under 35 U.S.C. 154(b) by 64 days.

(21) Appl. No.: 17/439,157

(22) PCT Filed: Mar. 15, 2019

(86) PCT No.: PCT/US2019/022537
§ 371 (c)(1),
(2) Date: Sep. 14, 2021

(87) PCT Pub. No.: WO2020/190265
PCT Pub. Date: Sep. 24, 2020

(65) Prior Publication Data
US 2022/0158540 A1 May 19, 2022

(51) Int. Cl.
*H02M 1/10* (2006.01)
*H02J 3/02* (2006.01)
(Continued)

(52) U.S. Cl.
CPC .............. *H02M 1/10* (2013.01); *H02J 3/007* (2020.01); *H02J 3/02* (2013.01); *H02J 3/381* (2013.01);
(Continued)

(58) Field of Classification Search
CPC .. H02M 1/10; H02M 3/33569; H02M 7/5387; H02M 7/797; H02M 3/1584;
(Continued)

(56) References Cited

U.S. PATENT DOCUMENTS 7,224,086 B2   5/2007   Germagian et al.
7,599,196 B2   10/2009  Alexander
(Continued)

FOREIGN PATENT DOCUMENTS

CN   102738836 A   10/2012
CN   106452136 A   2/2017
(Continued)

OTHER PUBLICATIONS

Hofmann, M. et al.. "Modular inverter power electronic for intelligent e-drives." In Electric Drives Production Conference (EDPC), 2012 2nd International, pp. 1-6. IEEE, 2012.
(Continued)

*Primary Examiner* — Rexford N Barnie
*Assistant Examiner* — Rasem Mourad
(74) *Attorney, Agent, or Firm* — Armstrong Teasdale LLP

(57) ABSTRACT

A customizable power conversion system (1000) is configured to operate with multiple alternating current (AC) and direct current (DC) power sources (1001,1003) and supplies multiple AC and DC loads (1018,1020,1022,1024). The customizable power conversion system is also configured to be assembled from a plurality of customizable power converters (1004,1006,1008,1010,1012), each of which is configured to function as a building block of the customizable power conversion system. More particularly, each customizable power converter may be configured as any DC/DC, DC/AC, AC/DC, or AC/AC converter, such as any of i) an inverter, ii) a DC/DC converter for use with a photovoltaic (PV) array (or string of PV arrays), and iii) a DC/DC
(Continued)

converter for use with an energy storage element (e.g., a battery or battery string).

17 Claims, 8 Drawing Sheets

(51) Int. Cl.
| | |
|---|---|
| *H02J 3/38* | (2006.01) |
| *H02J 3/00* | (2006.01) |
| *H02M 3/335* | (2006.01) |
| *H02M 7/5387* | (2007.01) |
| *H02M 7/797* | (2006.01) |

(52) U.S. Cl.
CPC ..... *H02M 3/33569* (2013.01); *H02M 7/5387* (2013.01); *H02M 7/797* (2013.01); *H02J 2300/24* (2020.01); *H02J 2300/28* (2020.01)

(58) Field of Classification Search
CPC .... H02J 3/007; H02J 3/02; H02J 3/381; H02J 2300/24; H02J 2300/28; H02J 7/35; H02J 2207/20; H02J 2300/40; H02J 3/38; Y02B 10/10; Y02E 10/56
See application file for complete search history.

(56) References Cited

U.S. PATENT DOCUMENTS

| | | | |
|---|---|---|---|
| 8,897,041 B2 | 11/2014 | Taddeo | |
| 9,130,400 B2 | 9/2015 | Terlizzi et al. | |
| 10,090,703 B2 | 10/2018 | Merkel et al. | |
| 2011/0273022 A1* | 11/2011 | Dennis | H02J 7/34 307/72 |
| 2012/0267952 A1* | 10/2012 | Ballatine | H02J 7/34 307/26 |
| 2013/0062953 A1* | 3/2013 | Nurmi | H02S 40/38 307/72 |
| 2013/0300196 A1* | 11/2013 | Clark | H02J 1/10 307/26 |
| 2017/0005564 A1* | 1/2017 | Somani | H02M 7/539 |
| 2018/0262117 A1 | 9/2018 | Lu et al. | |

FOREIGN PATENT DOCUMENTS

| | | |
|---|---|---|
| CN | 105515353 B | 6/2018 |
| EP | 2511999 A1 | 10/2012 |
| EP | 3127233 A1 | 2/2017 |
| WO | 2008024529 A2 | 2/2008 |
| WO | 2015153013 A1 | 10/2015 |

OTHER PUBLICATIONS

Product information for Delta true hybrid inverter E5 retrieved from website URL http://www.solar-inverter.com/en-GB/7214.htm.
Product information for Delta true hybrid inverter Model BX6.0 battery retrieved from website URL http://www.solar-inverter.com/en-GB/7195.htm.
Mozaffari, Khalegh, and Mahshid Amirabadi. "A family of highly reliable and efficient inductive-link universal power converters." In Energy Conversion Congress and Exposition (ECCE), 2017 IEEE, pp. 3462-3469. IEEE, 2017.
Andrade, J. et al., "Modified triple active bridge DC/AC three-phase converter with a series-resonant LC circuit on the AC-side." In Power Electronics Conference (SPEC), 2017 IEEE Southern, pp. 1-6. IEEE, 2017.
Qian, Z. et al.,"An integrated three-port inverter for stand-alone PV applications." In Energy Conversion Congress and Exposition (ECCE), 2010 IEEE, pp. 1471-1478. IEEE, 2010.
Kishore, P. et al., "A High Step-Up Multilevel DC-AC/DC Three-Port Converter using Single DC Source for Hybrid Microgrid Applications," 2016 IEEE International Conference on Power Electronics, Drives and Energy Systems (PEDES), Dec. 14-17, 2016, Trivandrum, India (6 pgs.).
International Search Report and Written Opinion (PCT/ISA/210, PCT/ISA/237), International Application No. PCT/US2019/022537, dated Nov. 29, 2019, 21 pages.

\* cited by examiner

CUSTOMIZABLE POWER CONVERTER AND CUSTOMIZABLE POWER CONVERSION SYSTEM

BACKGROUND

The subject matter disclosed herein relates generally to a customizable power converter. More particularly, the subject matter disclosed herein relates to a customizable power converter that can be configured to perform a variety of power conversion tasks. The subject matter disclosed herein also relates to a system of customizable power converters.

At least some known power distribution systems have attempted to incorporate multiple power conversion modules. For example, in some existing datacenters, a power distribution system may include a plurality of AC/DC power converters coupled to a common DC power distribution bus to supply power to one or more rack-mounted computing components.

Typically, the power converters included in these conventional power distribution systems are fixed, in that they are not capable of customization or configuration to suit a particular task. In addition, many power distribution systems are not customizable to receive and convert power from a variety of sources, such as renewable energy sources (solar, wind, etc.). Such systems are also not typically customizable for different load requirements.

BRIEF DESCRIPTION

In one aspect of this disclosure, a customizable power conversion system is provided. The customizable power conversion system is configured to operate with multiple alternating current (AC) and direct current (DC) power sources and configured to supply multiple AC and DC loads. The customizable power conversion system is also configured to be assembled from a plurality of customizable power converters, where each customizable power converter of the plurality of customizable power converters is configured to function as a building block of the customizable power conversion system. The customizable power conversion system includes at least an output bus, a first customizable power converter configured as one of i) an inverter (which can also operate as a rectifier), ii) a DC/DC converter for use with a photovoltaic (PV) array, and iii) a DC/DC converter for use with an energy storage element, and a second customizable power converter configured as one of i) an inverter, ii) a DC/DC converter for use with the PV array, and iii) a DC/DC converter for use with the energy storage element. At least one of i) an output of the first customizable power converter and ii) an output of the second customizable power converter is connected to the output bus.

In another aspect, a customizable power converter that is selectively reconfigurable as any of a direct current (DC) to DC converter, a DC to alternating current (AC) converter, an AC to DC converter, and an AC to AC converter is provided. The customizable power converter is further configured to function as a building block of a customizable power conversion system that includes a plurality of customizable power converters, the customizable power converter being modular, scalable, and easily paralleled to achieve a desired power rating within the customizable power conversion system. The customizable power converter is also capable of series connection with at least one other customizable power converter to achieve a desired output voltage within the customizable power conversion system. The customizable power converter includes at least a power conversion stage, a first input leg connected to a first input of the power conversion stage, a second input leg connected to a second input of the power conversion stage and selectively connectable to the first input leg, the second input leg selectively connectable to the first input leg for reconfiguring the customizable power converter. The customizable power converter also includes a third input leg connected to a third input of the power conversion stage and selectively connectable to the second input leg, the third input leg selectively connectable to the second input leg for reconfiguring the customizable power converter. The customizable power converter also includes a fourth input leg selectively connectable to a fourth input of the power conversion stage, the fourth input leg selectively connectable to the fourth input for reconfiguring the customizable power converter.

In yet another aspect, a system of customizable power conversion systems configured to operate with multiple alternating current (AC) and direct current (DC) power sources and configured to supply multiple AC and DC loads is provided. The system of customizable power conversion systems is capable of being scalable to achieve a desired power rating and is reconfigurable to selectively enable and disable one or more customizable power conversion systems of the system of customizable power conversion systems, whereby the system of customizable power conversion systems is capable of being dynamically managed to achieve a desired utilization and efficiency. The system of customizable power conversion systems includes at least a first customizable power conversion system comprising at least a first customizable power converter configured as one of i) an inverter, ii) a DC/DC converter for use with a photovoltaic (PV) array, and iii) a DC/DC converter for use with an energy storage element, and a second customizable power converter configured as one of i) an inverter, ii) a DC/DC converter for use with the PV array, and iii) a DC/DC converter for use with the energy storage element. The system of customizable power conversion systems also includes a second customizable power conversion system comprising at least a third customizable power converter configured as one of i) an inverter, ii) a DC/DC converter for use with a photovoltaic (PV) array, and iii) a DC/DC converter for use with an energy storage element, and a fourth customizable power converter configured as one of i) an inverter, ii) a DC/DC converter for use with the PV array, and iii) a DC/DC converter for use with the energy storage element.

DRAWINGS

These and other features, aspects, and advantages of the present disclosure will become better understood when the following detailed description is read with reference to the accompanying drawings in which like characters represent like parts throughout the drawings, wherein.

Figure 1:
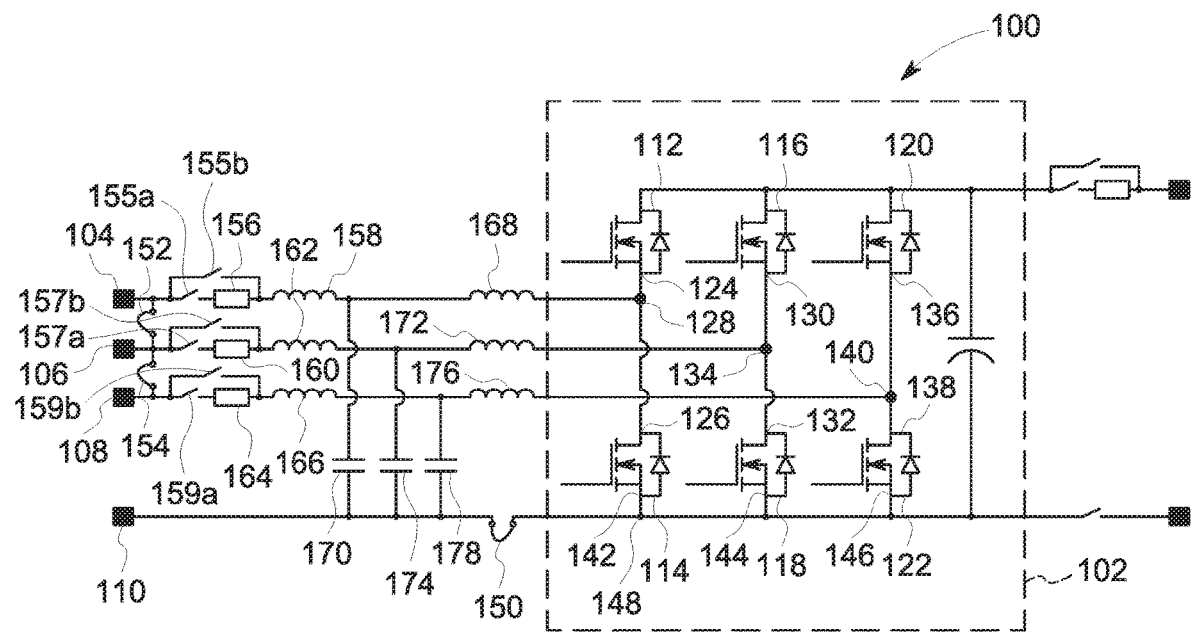
FIG. 1 is a circuit diagram of a customizable power converter.
Figure 10:
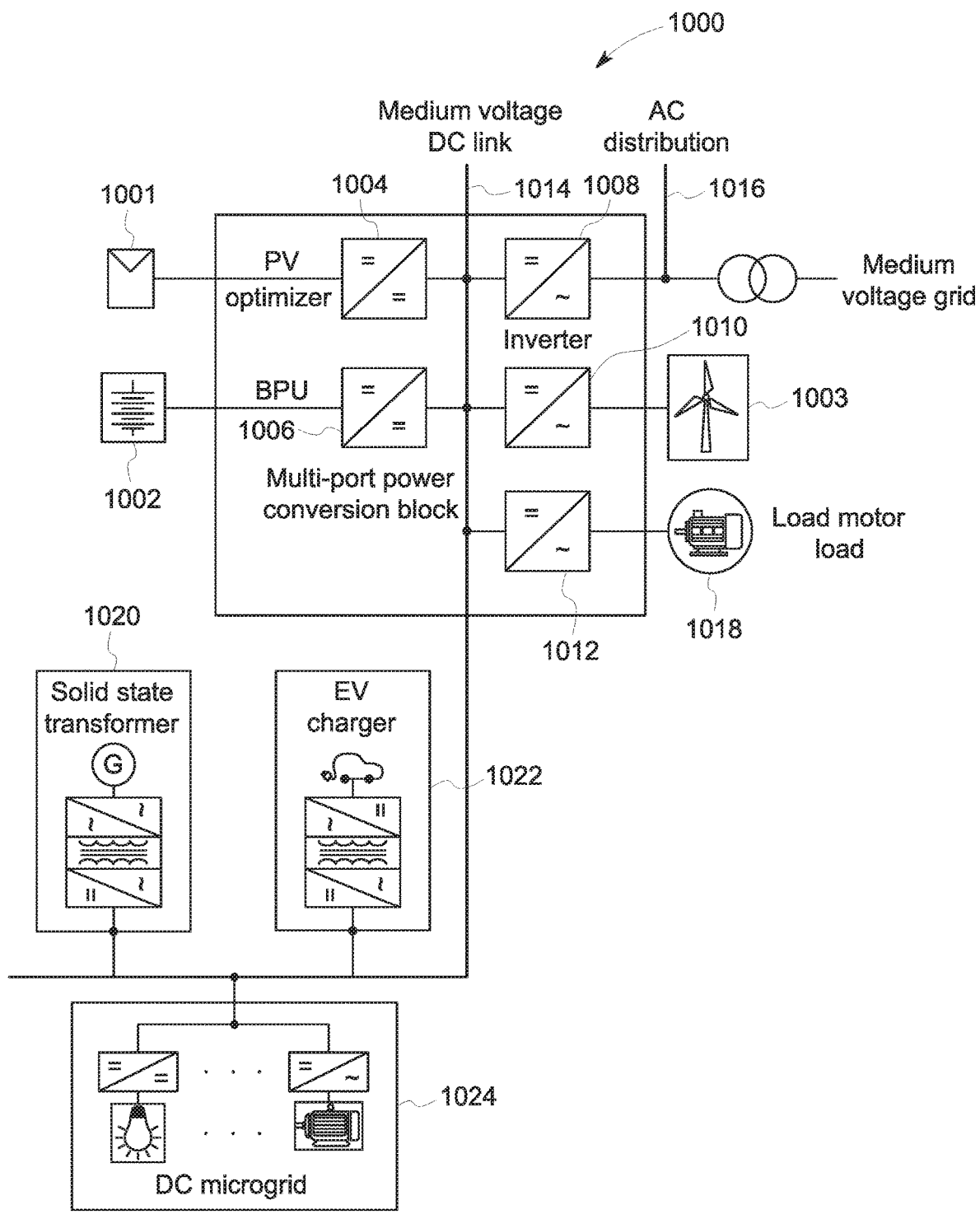
Figure 11:
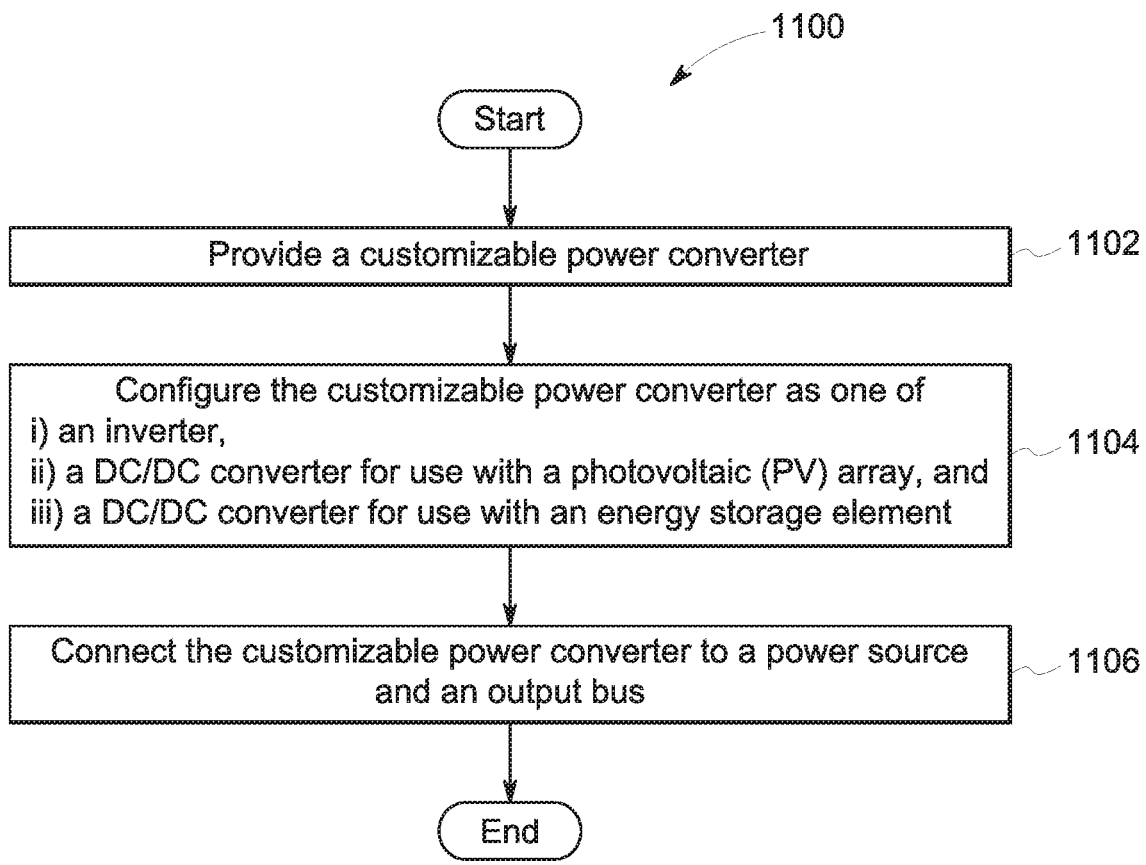

FIG. 10 is a block diagram of a customizable power conversion system, including a plurality of customizable power converters as shown in FIG. 1, in which the power conversion system is configured for use with a variety of power sources and illustrating a variety of loads connected to the power conversion system, and in which the power conversion system can be used to provide infrastructure to form a DC distribution system for low cost integration of other functionalities, including, for example, solid state transformer, DC faster charger, and DC microgrid functionalities; and FIG. 11 is a flowchart illustrating a process for configuring a customizable power converter.

Unless otherwise indicated, the drawings provided herein are meant to illustrate features of embodiments of the disclosure. These features are believed to be applicable to a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to a customizable power converter that can be configured and/or reconfigured to perform a variety of power conversion tasks. For example, the power converter may be configured as any of i) an inverter, such as, for example, an inverter (which may also operate as a rectifier), ii) a DC/DC converter for use with at least one photovoltaic (PV) array, and iii) a DC/DC converter for use with at least one energy storage element (e.g., a DC storage element, such as a battery or groups of batteries). In other embodiments, the power converter may be configured as any DC/DC, AC/DC, DC/AC, and/or AC/AC converter.

Embodiments of the present disclosure also relate to a customizable power conversion system. The system may include one or more customizable power converters. Specifically, the system may include one or more preconfigured or customized power converters, as described herein, to create a customized system enabled to receive and convert power from a variety of power sources, such as one or more PV arrays, one or more energy storage elements, and/or one or more wind power systems. The system may also supply power to any of a variety of AC and/or DC loads.

As used herein, the term "DC" refers to direct current. Likewise, as used herein, the term "AC" refers to alternating current.

FIG. 1 is a circuit diagram of a customizable power converter 100 (or "power converter" for simplicity). In the exemplary embodiment, power converter 100 includes a power conversion stage 102, a first input leg 104, a second input leg 106, a third input leg 108, and a fourth input leg 110. As described in greater detail below, power converter 100 may be configured or customized to function as a DC/DC converter, a DC/AC converter, an AC/DC converter, and/or an AC/AC converter.

Specifically, power converter 100 may be configured as an inverter, including, for example, a voltage inverter (e.g., a DC/AC converter capable of inverting input voltages). Such an inverter may also be referred to herein as a "string inverter" to indicate that the inverter is configured to receive an input voltage generated, in some cases, by connecting or "stringing" a plurality of DC power sources, such as solar panels or photovoltaic (PV) panels, electrically in series. In other embodiments, such an inverter may be referred to as a wind inverter or wind converter, such as, for example, when the inverter is arranged to be connected to one or more wind power sources. However, more generally, power converter 100 may simply be regarded as configurable as a power inverter.

Power converter 100 may also be configured, in at least some embodiments, as a DC/DC converter, such as, for example, a DC/DC converter for use with at least one photovoltaic (PV) array, and/or a DC/DC converter for use with at least one energy storage element (e.g., one or more batteries). As used herein, when power converter 100 is configured as a DC/DC converter for use with at least one PV array, power converter 100 may be referred to as a "PV optimizer," in that power converter 100 is used to operate one or multiple PV strings at a maximum power point (MPP), and hence optimize its operation. Similarly, as used herein, when power converter 100 is configured as a DC/DC converter for use with at least one energy storage element, power converter 100 may be referred to as a "battery power unit converter" or a "BPU converter" to indicate that power converter 100 is customized for use with at least one energy storage element, such as, for example, at least one or multiple battery strings. Other power conversion configurations may also be possible using the customizable architecture described herein, but these are not central to the understanding of the present disclosure and are not specifically enumerated herein.

In the exemplary embodiment, power conversion stage 102 includes a switching architecture that can be used in any of the power conversion applications described herein. The switching architecture of power conversion stage 102 may, for example, be established based on different power electronics topologies, such as, without limitation, a three-level flying capacitor topology, a three-level neutral point clamped (NPC) topology, and the like. Specifically, in at least one embodiment, power conversion stage 102 includes a first switch 112, a second switch 114, a third switch 116, a fourth switch 118, a fifth switch 120, and a sixth switch 122.

Although six switches 112-122 are described, it will be appreciated that a variety of other switching architectures may be implemented. For example, greater or fewer than six switches may be implemented, such as, for example, depending upon a number of input legs or inputs received by power converter 100. In addition, it will be appreciated that switches 112-122 may be implemented as any suitable switching element. For example, in one embodiment, switches 112-122 are Metal Oxide Semiconductor Field Effect Transistors (MOSFETs). In other embodiments, switches 112-122 are Insulated Gate Bipolar Transistors (IGBTs), Metal Oxide Semiconductor-Controlled Thyristors (MCTs), Gate Turn-off Thyristors (GTOs), Bipolar Junction Transistors (BJTs), High Electron Mobility Transistors (HEMTs), and the like. Further, switches 112-122 may be made with Silicon (Si), Silicon Carbide (SiC), Gallium Nitride (GaN), or any other wide bandgap semiconductor material such as Diamond.

Physically, first switch 112 is connected at a collector (or drain or anode) pin 124 thereof to an emitter (or source or cathode) pin 126 of second switch 114, and collector (or drain or anode) pin 124 of first switch 112 and emitter (or source or cathode) pin 126 of second switch 114 define a first input 128 of power conversion stage 102. Likewise, third switch 116 is connected at a collector (or drain or anode) pin 130 thereof to a emitter (or source or cathode) pin 132 of fourth switch 118, and collector (or drain or anode) pin 130 of third switch 116 and emitter (or source or cathode) pin 132 of fourth switch 118 define a second input 134 of power conversion stage 102. In addition, fifth switch 120 is connected at a collector (or drain or anode) pin 136 thereof to an emitter pin 138 of sixth switch 122, and collector (or drain or anode) pin 136 of fifth switch 120 and emitter (or source or cathode) pin 138 of sixth switch 122 define a third input 140 of power conversion stage 102. A collector (or drain or anode) pin 142 of second switch 114 may be connected to a collector (or drain or anode) pin 144 of fourth switch 118 and a collector (or drain or anode) pin 146 of sixth switch 122, and the interconnection may define a fourth input 148 of power conversion stage 102 in some embodiments.

In the exemplary embodiment, first input leg 104 is connected to first input 128 of power conversion stage 102. Likewise, second input leg 106 is connected to second input 134 of power conversion stage 102, third input leg 108 is connected to third input 140 of power conversion stage 102, and fourth input leg 110 is selectively connectable to fourth input 148 of power conversion stage 102. Specifically, in at least one embodiment, a jumper 150 may be used to selectively connect fourth input leg 110 to fourth input 148. Likewise, jumper 150 may be disconnected or removed to selectively disconnect fourth input leg 110 from fourth input 148.

As used herein, a "jumper" may include a short length of wire, a switch that can be connected and/or disconnected (e.g., opened and closed) between two parts of a circuit to electrically connect and/or disconnect one or more components separated by the switch, and/or any other suitable means for connecting and disconnecting portions of a circuit. In the instance that a jumper includes a short length of wire, the jumper may, for example, be soldered or otherwise coupled in place (or removed if already in place) within power converter 100 prior to installation of power converter 100 in the field. Thus, one or more jumpers may be used, as described herein, to alter or customize the architecture of power converter 100. In so doing, power converter 100 may function as described herein, to perform a variety of power conversion tasks.

In the exemplary embodiment, a jumper 152 may also be connected and/or disconnected between first input leg 104 and second input leg 106 to selectively connect first input leg 104 to second input leg 106 and/or to selectively disconnect first input leg 104 from second input leg 106. Likewise, a jumper 154 may be connected and/or disconnected between second input leg 106 and third input leg 108 to selectively connect second input leg 106 to third input leg 108 and/or to selectively disconnect second input leg 108 from third input leg 108.

In addition, first input leg 104 may include a first selectable resistor 156 and/or a first inductor 158. In at least one embodiment, first selectable resistor 156 may be connected in series with a first switch 155a and in parallel with a second switch 155b. During operation, first switch 155a may be initially closed while second switch 155b may be initially open. After a desired period of time, second switch 155b may be closed to shunt first selectable resistor 156 out of first input leg 104.

Likewise, second input leg 106 may include a second selectable resistor 160, a second inductor 162, a first switch 157a and a second switch 157b. First switch 157a and second switch 157b may function as described above with reference to first and second switches 155a and 155b of first input leg 104. In addition, third input leg 108 may include a third selectable resistor 164, a third inductor 166, a first switch 159a and a second switch 159b. First switch 159a and second switch 159b may function as described above with reference to first and second switches 155a and 155b of first input leg 104.

In the exemplary embodiment, first input leg 104 may also include a first fixed (or non-selectable) inductor 168 and/or a first capacitor 170, which may be electrically connected between an output of first selectable inductor 158 and fourth input leg 110. Similarly, second input leg 106 may include a second fixed (or non-selectable) inductor 172 and/or a second capacitor 174, which may be electrically connected between an output of second selectable inductor 162 and fourth input leg 110. In addition, third input leg 108 may include a third fixed (or non-selectable) inductor 176 and/or a third capacitor 178, which may be electrically connected between an output of third selectable inductor 166 and fourth input leg 110.

Thus, power converter 100 may be configured or customized to function in several different ways, such as by connecting and/or disconnecting one or more circuit elements, as described herein, using one or more switches and/or jumpers. For example, power converter 100 may be configured as an inverter, a DC/DC converter for use with a plurality of DC sources (such as a plurality of PV panels or PV arrays), and/or a DC/DC converter for use with one or more energy storage elements (e.g., one or more batteries). In other embodiments, power converter may more generally be configured as any DC/DC, DC/AC, AC/DC, or AC/AC power converter.

Figure 2:
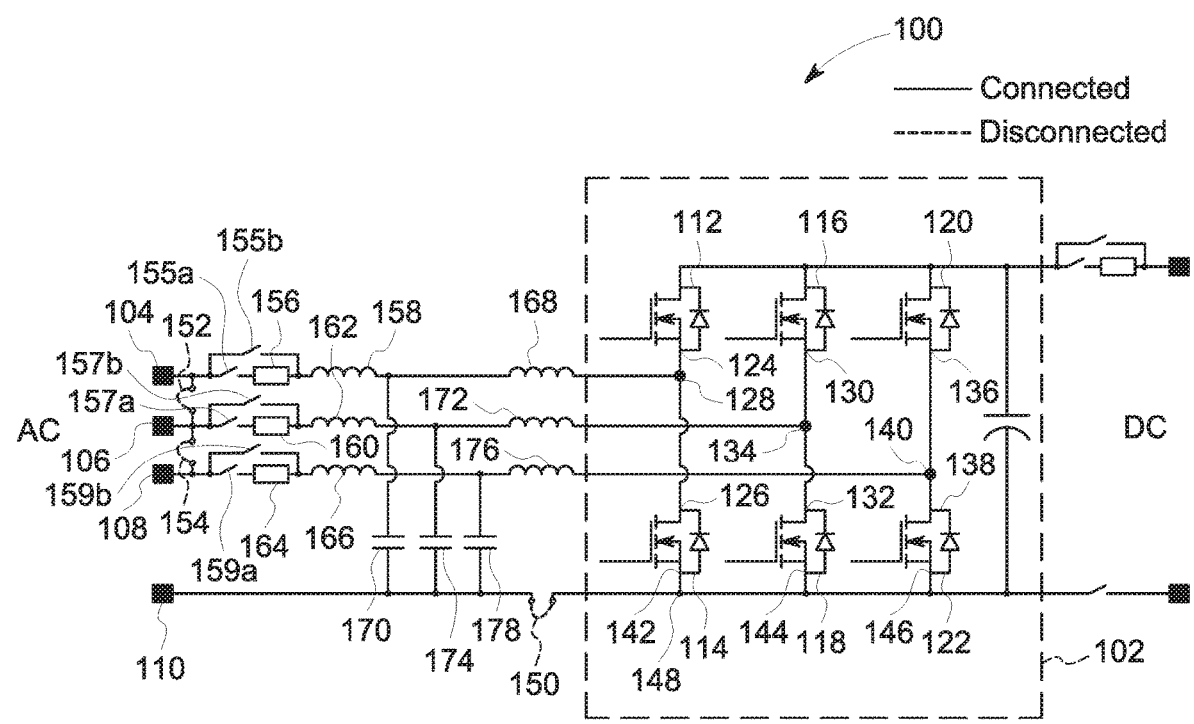
FIG. 2 is a circuit diagram of the customizable power converter shown in FIG. 1, in which the customizable power converter is configured as an inverter.

FIG. 2 is a circuit diagram of customizable power converter 100 (shown in FIG. 1), in which power converter 100 is configured as an inverter. Accordingly, to configure power converter 100 as an inverter, second input leg 106 is selectively disconnected from first input leg 104, third input leg 108 is selectively disconnected from second input leg 106, and fourth input leg 110 is selectively disconnected from fourth input 148 of power conversion stage 102 by removing the jumpers 152 and 154. For example, as described herein, one or more jumpers may be removed or soldered in place (e.g., in the case jumpers are wires) and/or opened or closed (e.g., in the case jumpers are switches) to selectively connect and/or disconnect the circuit elements described above.

Figure 3:
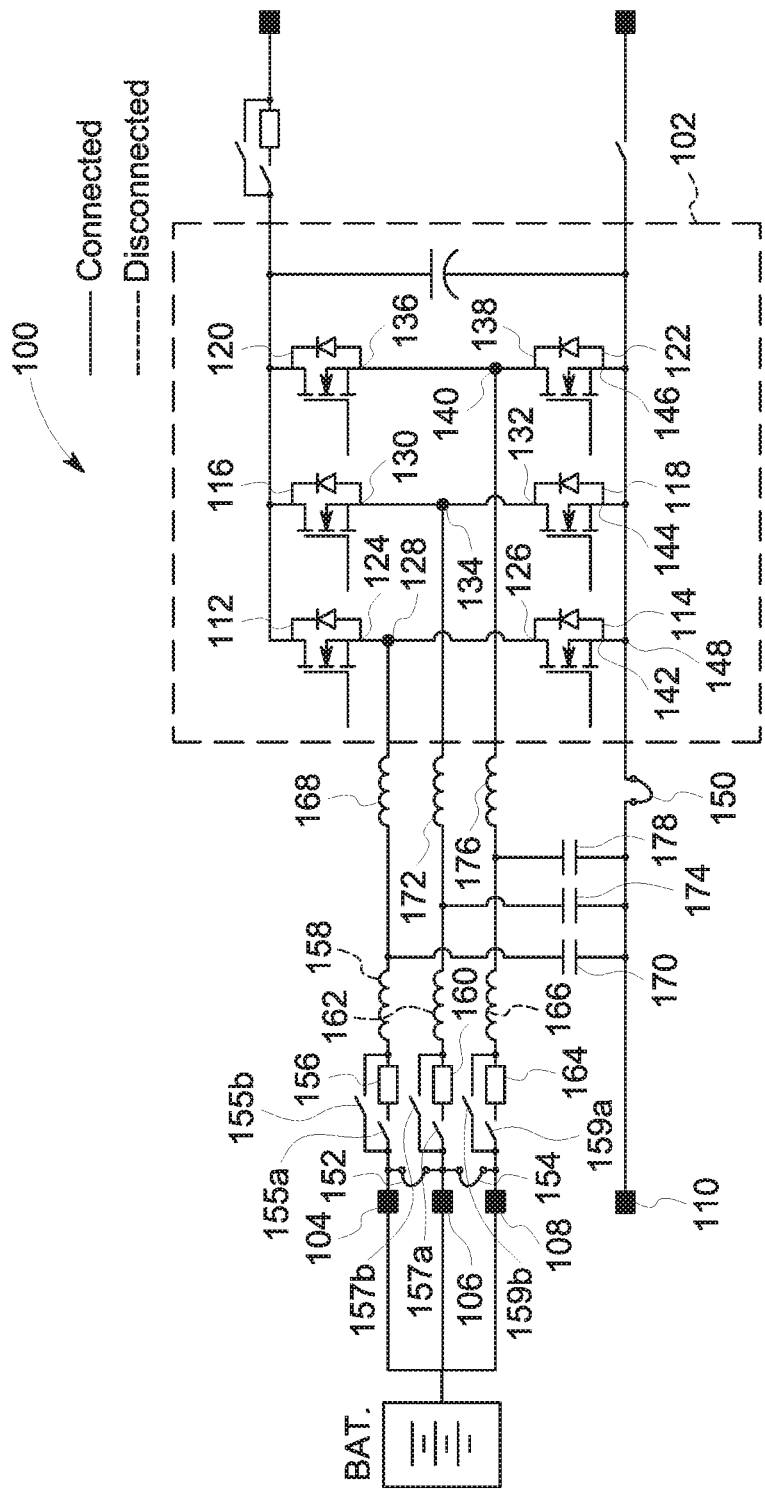
FIG. 3 is a circuit diagram of the customizable power converter shown in FIG. 1, in which the customizable power converter is configured as a DC/DC converter for use with at least one energy storage element, such as at least one battery.

FIG. 3 is a circuit diagram of customizable power converter 100 (shown in FIG. 1), in which power converter 100 is configured as a DC/DC converter for use with at least one energy storage element, such as at least one battery (or a string of batteries). Accordingly, to configure the DC/DC converter for use with at least one energy storage element, second input leg 106 is selectively connected to first input leg 104, third input leg 108 is selectively connected to second input leg 106, and fourth input leg 110 is selectively connected to fourth input 148 of power conversion stage 102 by removing jumpers 152 and 154. For example, as described herein, one or more jumpers may be removed or soldered in place (e.g., in the case jumpers are wires) and/or opened or closed (e.g., in the case jumpers are switches) to selectively connect and/or disconnect the circuit elements described above. Moreover, in at least some embodiments, three legs (104, 106 and 108) can be connected in parallel with interleaved control to further minimize battery ripple current.

Figure 4:
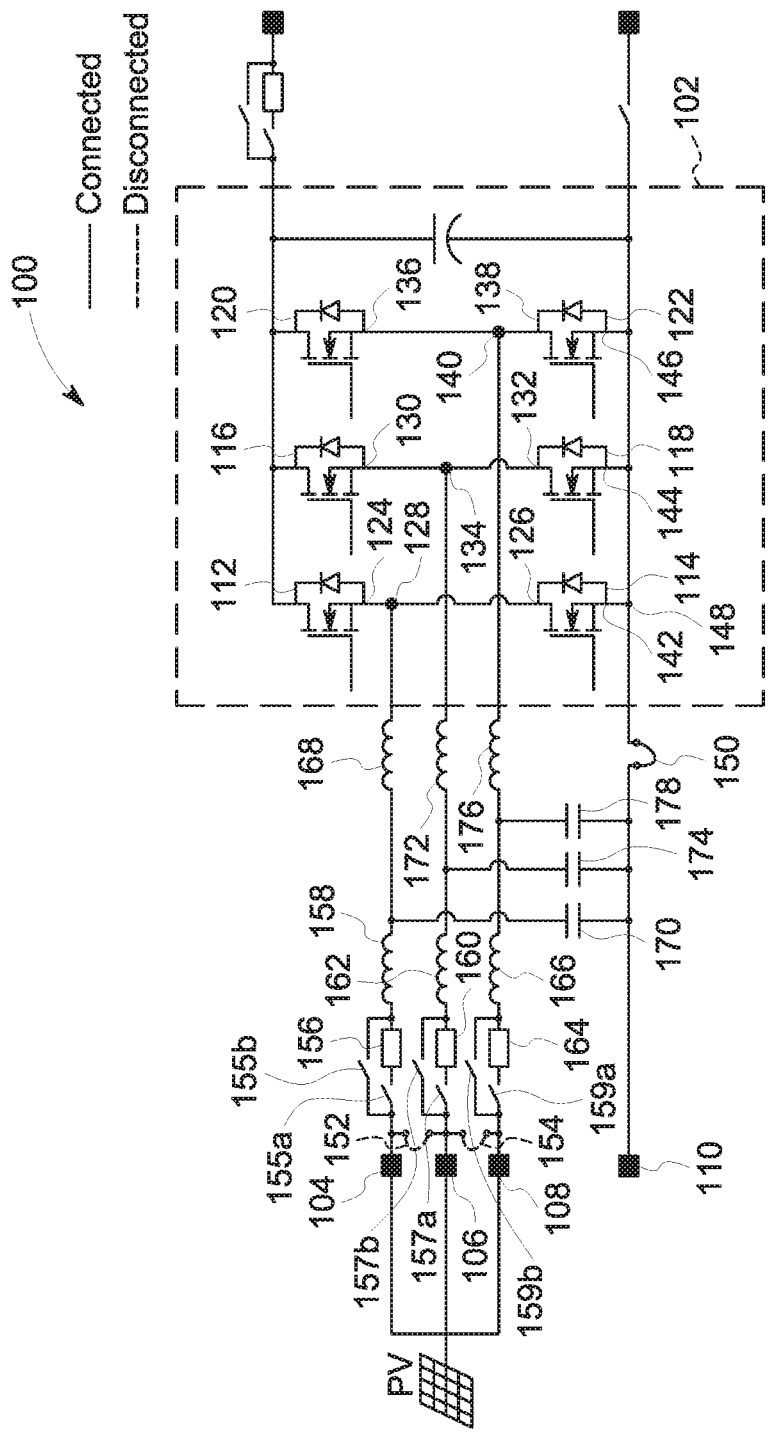
FIG. 4 is a circuit diagram of the customizable power converter shown in FIG. 1, in which the customizable power converter is configured as a DC/DC converter for use with at least one DC source, such as at least one photovoltaic (PV) array.

FIG. 4 is a circuit diagram of customizable power converter 100 (shown in FIG. 1), in which power converter 100 is configured as a DC/DC converter for use with at least one DC source, such as at least one photovoltaic (PV) panel, string, group of strings, or a portion of a PV array. To configure power converter 100 as a DC/DC converter for use with a PV string(s), second input leg 106 is disconnected from first input leg 104, third input leg 108 is selectively disconnected from second input leg 106, and fourth input leg 110 is selectively connected to the fourth input 148 of power conversion stage 102. For example, as described herein, one or more jumpers may be removed or soldered in place (e.g., in the case jumpers are wires) and/or opened or closed (e.g., in the case jumpers are switches) to selectively connect and/or disconnect the circuit elements described above.

In addition to the different configurations of power converter 100 described above, in the exemplary embodiment, one or more power converters 100 may be packaged or grouped in a power conversion system customized for a particular application or electrical distribution network. Such a system may be referred to herein as a "multi-port power conversion block" or simply a "customized power conversion system" to indicate, for example, that the system is modular, customizable using a plurality of power converters 100 configured as desired, and includes a plurality of input channels or "ports," each corresponding, for example, to one or more inputs or input legs of a respective power converter 100.

Figure 5:
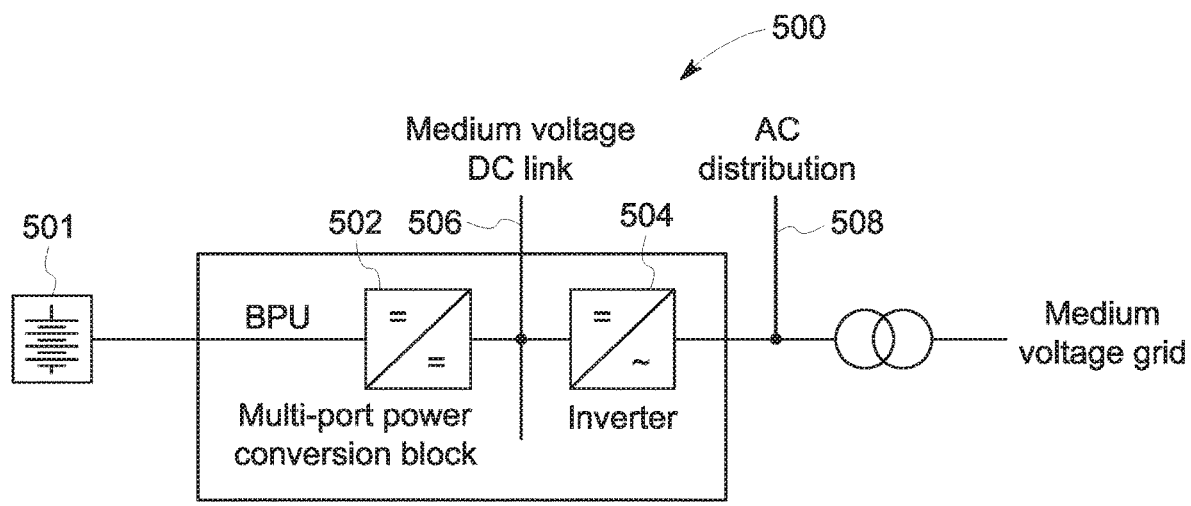
FIG. 5 is a block diagram of a customizable power conversion system, including a plurality of customizable power converters as shown in FIG. 1, in which the power conversion system is configured for use with at least one energy storage element.

FIG. 5 is a block diagram of a customizable power conversion system 500. In the exemplary embodiment, system 500 is customized and configured for use with at least one energy storage element 501 (e.g., at least one battery) and includes a first customizable power converter 502 and a second customizable power converter 504.

First customizable power converter 502 may be configured, as described above, as a DC/DC converter for use with energy storage element 501 (see FIG. 3 for configuration). Second customizable power converter 504 may be configured as an inverter (see FIG. 2 for configuration).

In addition, a DC link or DC bus 506 may be connected to an output of power converter 502 between first power converter 502 and second power converter 504. Further, an AC link or AC bus 508 may be connected to an output of second power converter 504. Thus, system 500 may be configured to supply a DC voltage as well as an AC voltage to a plurality of AC and/or DC loads connected to system 500.

Figure 6:
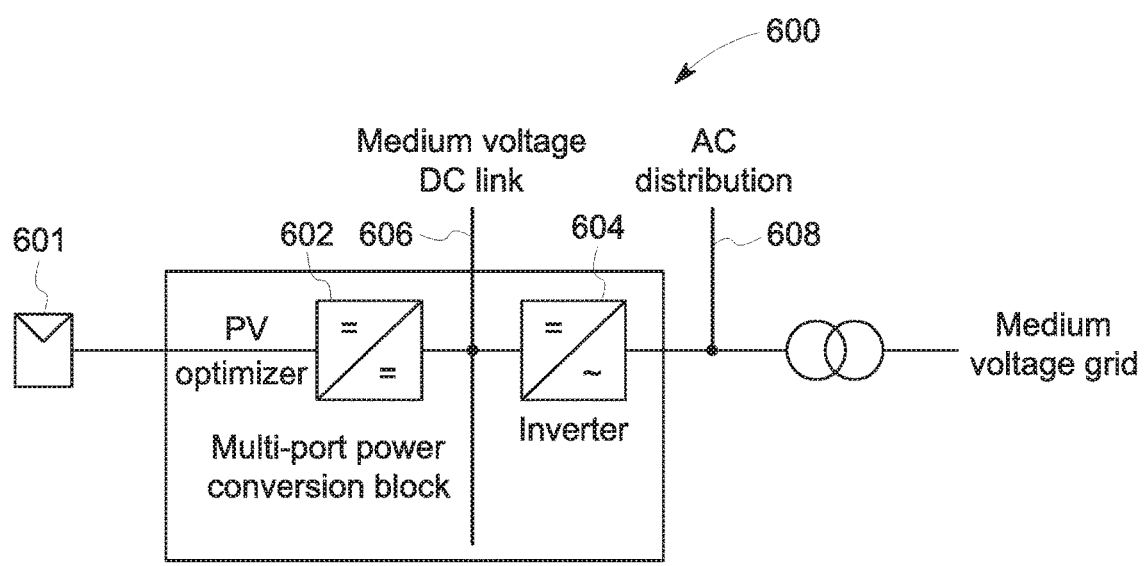
FIG. 6 is a block diagram of a customizable power conversion system, including a plurality of customizable power converters as shown in FIG. 1, in which the power conversion system is configured for use with at least one PV array.

FIG. 6 is a block diagram of a customizable power conversion system 600. In the exemplary embodiment, system 600 is configured for use with at least one DC source, such as at least one PV panel or PV array 601. Accordingly, system 600 includes a first customizable power converter 602 and a second customizable power converter 604.

First customizable power converter 602 may be configured, as described above, as a DC/DC converter for use with PV array 601 (see FIG. 4 for configuration). Second customizable power converter 604 may be configured as an inverter (see FIG. 2 for configuration).

In addition, a DC link or DC bus 606 may be connected to an output of first power converter 602 between first power converter 602 and second power converter 604. Further, an AC link or AC bus 608 may be connected to an output of second power converter 604. Thus, system 600 may be configured to supply a DC voltage as well as an AC voltage to a plurality of AC and/or DC loads connected to system 600.

Figure 7:
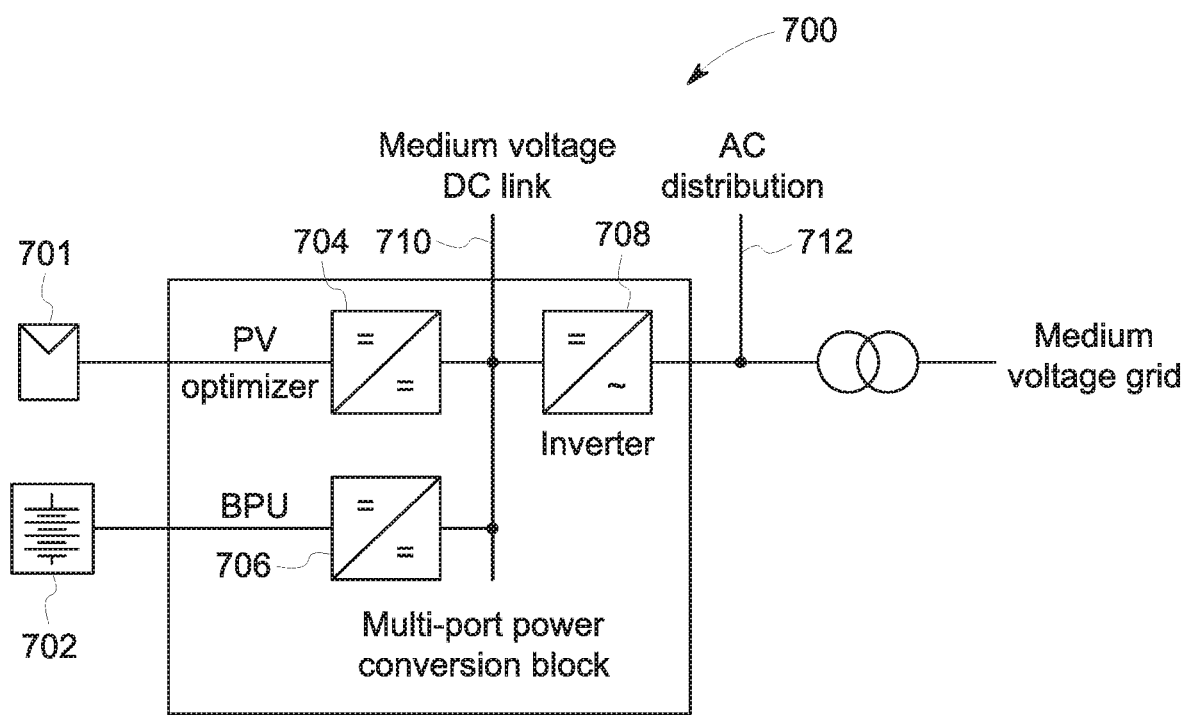
FIG. 7 is a block diagram of a customizable power conversion system, including a plurality of customizable power converters as shown in FIG. 1, in which the power conversion system is configured for use with at least one energy storage element and at least one PV array with a DC/DC optimizer.

FIG. 7 is a block diagram of a customizable power conversion system 700. In the exemplary embodiment, system 700 is configured for use with at least one PV array 701 and at least one energy storage element 702 (e.g., at least one battery). To this end, system 700 includes a first customizable power converter 704, a second customizable power converter 706, and a third customizable power converter 708.

First customizable power converter 704 may be configured, as described above, as a DC/DC converter for use with PV array 701 (see FIG. 4 for configuration). Second customizable power converter 706 may be configured as a DC/DC converter for use with energy storage element 702 (see FIG. 3 for configuration). Third customizable power converter 708 may be configured as an inverter (see FIG. 2 for configuration).

In addition, a DC link or DC bus 710 may be connected to an output of first power converter 704 and an output of second power converter 706, each of which may provide an output power to the DC bus 710. Further, an AC link or AC bus 712 may be connected to an output of third power converter 708. Thus, system 700 may be configured to supply a DC voltage as well as an AC voltage to a plurality of AC and/or DC loads connected to system 700.

Figure 8:
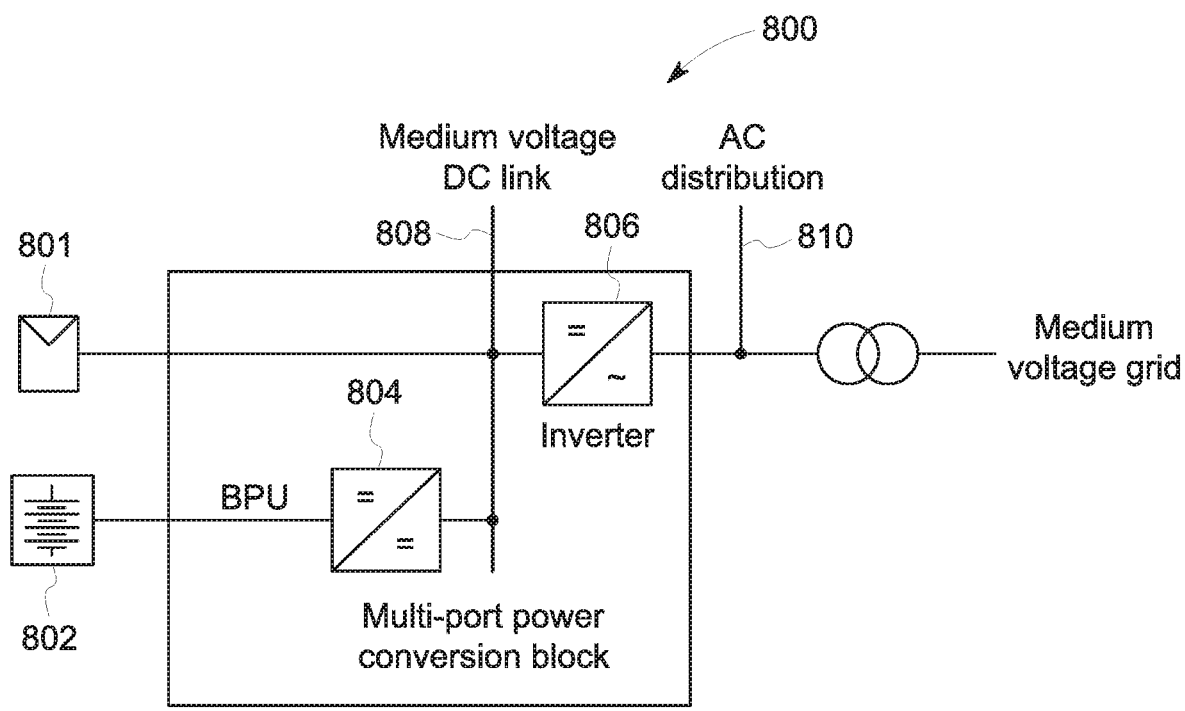
FIG. 8 is a block diagram of a customizable power conversion system, including a plurality of customizable power converters as shown in FIG. 1, in which the power conversion system is configured in another arrangement for use with at least one energy storage element and at least one PV array without a DC/DC optimizer.

FIG. 8 is a block diagram of a customizable power conversion system 800. In the exemplary embodiment, system 800 is configured for use with at least one PV array 801 and at least one energy storage element 802 (e.g., at least one battery). System 800 may be implemented as an alternative to system 700, such as, for example, where it is unnecessary to step a DC voltage from PV array 701 up or down prior to conversion to AC at inverter 708. Accordingly, system 800 includes a first customizable power converter 804 and a second customizable power converter 806.

In the exemplary embodiment, first customizable power converter 804 may be configured, as described above, as a DC/DC converter for use with energy storage element 801 (see FIG. 3 for configuration). Second customizable power converter 806 may be configured as an inverter (see FIG. 2 for configuration).

In addition, a DC link or DC bus 808 may be connected to an output of first power converter 804 and/or a direct output of PV array 801, each of which may provide an output power to the DC bus 808. Further, an AC link or AC bus 810 may be connected to an output of second power converter 806. Thus, system 800 may be configured to supply a DC voltage as well as an AC voltage to a plurality of AC and/or DC loads connected to system 800.

Figure 9:
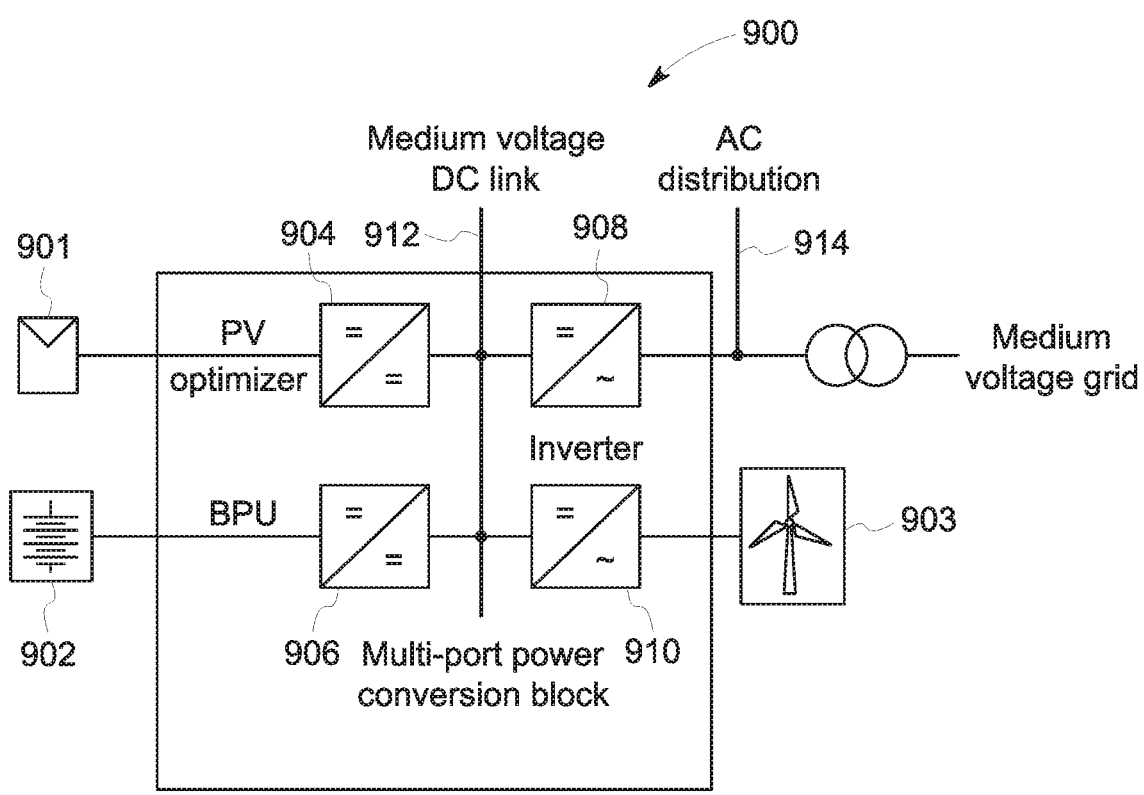
FIG. 9 is a block diagram of a customizable power conversion system, including a plurality of customizable power converters as shown in FIG. 1, in which the power conversion system is configured for use with at least one energy storage element, at least one PV array, and at least one wind power system.

FIG. 9 is a block diagram of a customizable power conversion system 900. In the exemplary embodiment, system 900 is configured for use with at least one PV array 901, at least one energy storage element 902, and at least one wind power system 903. Accordingly, system 900 includes a first customizable power converter 904, a second customizable power converter 906, a third customizable power converter 908, and a fourth customizable power converter 910.

First customizable power converter 904 may be configured, as described above, as a DC/DC converter for use with PV array 901 (see FIG. 4 for configuration). Second customizable power converter 906 may be configured as a DC/DC converter for use with energy storage element 902 (see FIG. 3 for configuration). Third customizable power converter 908 and fourth customizable power converter 910 may be configured as inverters (see FIG. 2 for configuration).

In addition, a DC link or DC bus 912 may be connected to an output of first power converter 904, an output of second power converter 906, and an output of fourth power converter 910, each of which may provide an output power to the DC bus 912. Further, an AC link or AC bus 914 may be connected to an output of third power converter 908. Thus, system 900 may be configured to supply a DC voltage as well as an AC voltage to a plurality of AC and/or DC loads connected to system 900.

FIG. 10 is a block diagram of a customizable power conversion system 1000. System 1000 is similar to system 900 (illustrating several DC and AC sources), except that system 1000 also illustrates connection of a variety of loads to system 1000. Specifically, in the exemplary embodiment, system 1000 is configured for use with at least one PV array 1001, at least one energy storage element 1002, and at least one wind power system 1003. In addition, system 1000 includes a first customizable power converter 1004, a second customizable power converter 1006, a third customizable power converter 1008, a fourth customizable power converter 1010, and a fifth customizable power converter 1012.

First customizable power converter 1004 may be configured, as described above, as a DC/DC converter for use with PV array 1001 (see FIG. 4 for configuration). Second customizable power converter 1006 may be configured as a DC/DC converter for use with energy storage element 1002 (see FIG. 3 for configuration). Third customizable power converter 1008, fourth customizable power converter 1010, and fifth customizable power converter 1012 may be configured as inverters (see FIG. 2 for configuration).

In addition, a DC link or DC bus 1014 may be connected to an output of first power converter 1004, an output of second power converter 1006, and an output of fourth power converter 1010, each of which may provide an output power to the DC bus 1014. Further, an AC link or AC bus 1016 may be connected to an output of third power converter 1008. Thus, system 1000 may be configured to supply a DC voltage as well as an AC voltage to a plurality of loads connected to system 1000. For example, one or more AC loads, such as a first load 1018, may be coupled to an output of fifth power converter 1012 and/or to AC bus 1016. Likewise, a variety of DC loads, such as a second load 1020, a third load 1022, and/or a fourth load 1024 may be coupled to DC bus 1014.

FIG. 11 is a flowchart illustrating a process 1100 for configuring a customizable power converter, such as any of the power converters described herein. Accordingly, in conjunction with the embodiments described herein, a customizable power converter, such as power converter 100, is provided (step 1102) and configured as one of i) an inverter, ii) a DC/DC converter for use with at least one photovoltaic (PV) array, and iii) a DC/DC converter for use with an energy storage element (step 1104). As described in detail herein, to configure the power converter 100, one or more electrical connections may be made or removed from power converter 100 to adjust the architecture of power converter 100 as desired. The power converter 100 may, in addition and once configured or customized as desired, be connected to one or more busses (e.g., one or more AC and/or DC busses) to supply power to one or more loads (step 1106).

Embodiments of the present disclosure thus relate to a customizable power converter that can be configured and reconfigured to perform a variety of power conversion tasks. For example, the power converter may be configured as any of i) an inverter, ii) a DC/DC converter for use with at least one photovoltaic (PV) array, and/or iii) a DC/DC converter for use with at least one energy storage element (e.g., a DC storage element, such as a battery).

Embodiments of the present disclosure also relate to a customizable power conversion system. The system may include one or more customizable power converters, as described herein. In addition, the system may be customized, using one or more preconfigured or customized power converters, to receive and convert power from a variety of power sources, such as one or more PV arrays, one or more energy storage elements, and/or one or more wind power systems. The system may also supply power to any of a variety of AC and/or DC loads.

Exemplary technical effects of the customizable power converter and customizable power conversion system include, at least: (a) creation of any of a variety of customized power converters from a base or standard power converter architecture, including, for example, any of i) an inverter, ii) a DC/DC converter for use with at least one photovoltaic (PV) array, and iii) a DC/DC converter for use with a least one energy storage element (e.g., a DC storage element, such as a battery); and (b) creation of a large variety of customized power conversion systems using a plurality of customized power converters to receive power from a variety of power sources (e.g., PV, battery, and/or wind sources) as well as to supply power to a variety of DC and/or AC loads.

Exemplary embodiments of customized power converter and customized power conversion system and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with the systems and related methods as described herein. Rather, the exemplary embodiment can be implemented and utilized in connection with many applications where power conversion is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A customizable power conversion system configured to operate with multiple alternating current (AC) and direct current (DC) power sources and configured to supply multiple AC and DC loads, said customizable power conversion system configured to be assembled from a plurality of customizable power converters, each customizable power converter of the plurality of customizable power converters configured to function as a building block of said customizable power conversion system, said customizable power conversion system comprising at least:

an output bus;
a first customizable power converter configured as one of i) an inverter, ii) a DC/DC converter for use with a photovoltaic (PV) array, and iii) a DC/DC converter for use with an energy storage element, wherein said first customizable power converter comprises:
a power conversion stage;
a first input leg connected to a first input of said power conversion stage;
a second input leg connected to a second input of said power conversion stage and selectively connectable to said first input leg, said second input leg selectively connectable to said first input leg for reconfiguring said first customizable power converter;
a third input leg connected to a third input of said power conversion stage and selectively connectable to said second input leg, said third input leg selectively connectable to said second input leg for reconfiguring said first customizable power converter; and
a fourth input leg selectively connectable to a fourth input of said power conversion stage, said fourth input leg selectively connectable to the fourth input for reconfiguring said first customizable power converter; and
a second customizable power converter configured as one of i) an inverter capable of operation as a rectifier, ii) a DC/DC converter for use with the PV array, and iii) a DC/DC converter for use with the energy storage element, wherein:
at least one of i) an output of said first customizable power converter and ii) an output of said second customizable power converter is connected to said output bus.

2. The customizable power conversion system of claim 1, further comprising at least a third customizable power converter configured as one of i) an inverter, ii) a DC/DC converter for use with the PV array, and iii) a DC/DC converter for use with the energy storage element.

3. The customizable power conversion system of claim 1, wherein to configure said first customizable power converter as the inverter, said second input leg is selectively disconnected from said first input leg, said third input leg is selectively disconnected from said second input leg, and said fourth input leg is selectively disconnected from the fourth input of said power conversion stage.

4. The customizable power conversion system of claim 1, wherein to configure said first customizable power converter as the DC/DC converter for use with the PV array, said second input leg is selectively disconnected from said first input leg, said third input leg is selectively disconnected from said second input leg, and said fourth input leg is selectively connected to the fourth input of said power conversion stage.

5. The customizable power conversion system of claim 1, wherein to configure said first customizable power converter as the DC/DC converter for use with the energy storage element, said second input leg is selectively connected to said first input leg, said third input leg is selectively connected to said second input leg, and said fourth input leg is selectively connected to the fourth input of said power conversion stage.

6. A customizable power converter that is selectively reconfigurable as any of a direct current (DC) to DC converter, a DC to alternating current (AC) converter, an AC to DC converter, and an AC to AC converter, said customizable power converter further configured to function as a building block of a customizable power conversion system that includes a plurality of customizable power converters, said customizable power converter being modular, scalable, and easily paralleled to achieve a desired power rating within the customizable power conversion system, said customizable power converter also being capable of series connection with at least one other customizable power converter to achieve a desired output voltage within the customizable power conversion system, said customizable power converter comprising at least:

a power conversion stage;
a first input leg connected to a first input of said power conversion stage;
a second input leg connected to a second input of said power conversion stage and selectively connectable to said first input leg, said second input leg selectively connectable to said first input leg for reconfiguring said customizable power converter;
a third input leg connected to a third input of said power conversion stage and selectively connectable to said second input leg, said third input leg selectively connectable to said second input leg for reconfiguring said customizable power converter; and a fourth input leg selectively connectable to a fourth input of said power conversion stage, said fourth input leg selectively connectable to said fourth input for reconfiguring said customizable power converter.

7. The customizable power converter of claim 6, wherein said fourth input leg is connected, through at least one capacitor, to said first input leg, said second input leg, and said third input leg.

8. The customizable power converter of claim 6, wherein said power conversion stage comprises at least:

a first switch and a second switch, said first switch connected at a collector pin thereof to an emitter pin of said second switch, the collector pin of said first switch and the emitter pin of said second switch defining the first input of said power conversion stage;

a third switch and a fourth switch, said third switch connected at a collector pin thereof to an emitter pin of said fourth switch, the collector pin of said third switch and the emitter pin of said fourth switch defining the second input of said power conversion stage; and a fifth switch and a sixth switch, said fifth switch connected at a collector pin thereof to an emitter pin of said sixth switch, the collector pin of said fifth switch and the emitter pin of said sixth switch defining the third input of said power conversion stage.

9. The customizable power converter of claim 8, wherein said first switch, said second switch, said third switch, said fourth switch, said fifth switch, and said sixth switch comprise metal oxide semiconductor field effect transistors (MOSFETS).

10. The customizable power converter of claim 6, wherein said first input leg comprises a first selectable inductor, wherein said second input leg comprises a second selectable inductor, and wherein said third input leg comprises a third selectable inductor.

11. The customizable power converter of claim 6, further comprising a first jumper configured to selectively connect said first input leg to said second input leg, a second jumper configured to selectively connect said second input leg to said third input leg, and a third jumper configured to selectively connect said fourth input leg to the fourth input of said power conversion stage.

12. The customizable power converter of claim 6, wherein said customizable power converter is configurable as an inverter, and wherein to configure the inverter, said second input leg is selectively disconnected from said first input leg, said third input leg is selectively disconnected from said second input leg, and said fourth input leg is selectively disconnected from the fourth input of said power conversion stage.

13. The customizable power converter of claim 6, wherein said customizable power converter is configurable as a DC/DC converter for use with a photovoltaic (PV) array, and wherein to configure the DC/DC converter, said second input leg is selectively disconnected from said first input leg, said third input leg is selectively disconnected from said second input leg, and said fourth input leg is selectively connected to the fourth input of said power conversion stage.

14. The customizable power converter of claim 6, wherein said customizable power converter is configurable as a DC/DC converter for use with an energy storage element, and wherein to configure the DC/DC converter, said second input leg is selectively connected to said first input leg, said third input leg is selectively connected to said second input leg, and said fourth input leg is selectively connected to the fourth input of said power conversion stage.

15. A system of customizable power converters configured to operate with multiple alternating current (AC) and direct current (DC) power sources and configured to supply multiple AC and DC loads, said system of customizable power converters capable of being scalable to achieve a desired power rating, said system of customizable power converters reconfigurable to selectively enable and disable one or more customizable power converters of the system of customizable power converters, whereby said system of customizable power converters is capable of being dynamically managed to achieve a desired utilization and efficiency, said system of customizable power converters comprising at least:

a first customizable power converter configured as one of i) an inverter, ii) a DC/DC converter for use with a photovoltaic (PV) array, and iii) a DC/DC converter for use with an energy storage element;

a second customizable power converter configured as one of i) an inverter, ii) a DC/DC converter for use with the PV array, and iii) a DC/DC converter for use with the energy storage element;

a third customizable power converter configured as one of i) an inverter, ii) a DC/DC converter for use with a photovoltaic (PV) array, and iii) a DC/DC converter for use with an energy storage element; and a fourth customizable power converter configured as one of i) an inverter, ii) a DC/DC converter for use with the PV array, and iii) a DC/DC converter for use with the energy storage element, wherein each of said first customizable power converter, said second customizable power converter, said third customizable power converter, and said fourth customizable power converter comprises:

a power conversion stage;

a first input leg connected to a first input of said power conversion stage;

a second input leg connected to a second input of said power conversion stage and selectively connectable to said first input leg, said second input leg selectively connectable to said first input leg for reconfiguring a respective one of said first customizable power converter, said second customizable power converter, said third customizable power converter, or said fourth customizable power converter;

a third input leg connected to a third input of said power conversion stage and selectively connectable to said second input leg, said third input leg selectively connectable to said second input leg for reconfiguring said respective one of said first customizable power converter, said second customizable power converter, said third customizable power converter, or said fourth customizable power converter; and a fourth input leg selectively connectable to a fourth input of said power conversion stage, said fourth input leg selectively connectable to the fourth input for reconfiguring said respective one of said first customizable power converter, said second customizable power converter, said third customizable power converter, or said fourth customizable power converter.

16. The system of customizable power converters of claim 15, further comprising at least one output bus, wherein at least one of i) an output of said first customizable power converter and ii) an output of said second customizable power converter, iii) an output of said third customizable power converter, and iv) an output of said fourth customizable power converter is connected to said output bus to supply at least one load.

17. The system of customizable power converters of claim 15, wherein at least said first customizable power converter and said second customizable power converter are electrically connected to supply a desired output voltage to at least one load.

* * * * *